Figure 1:
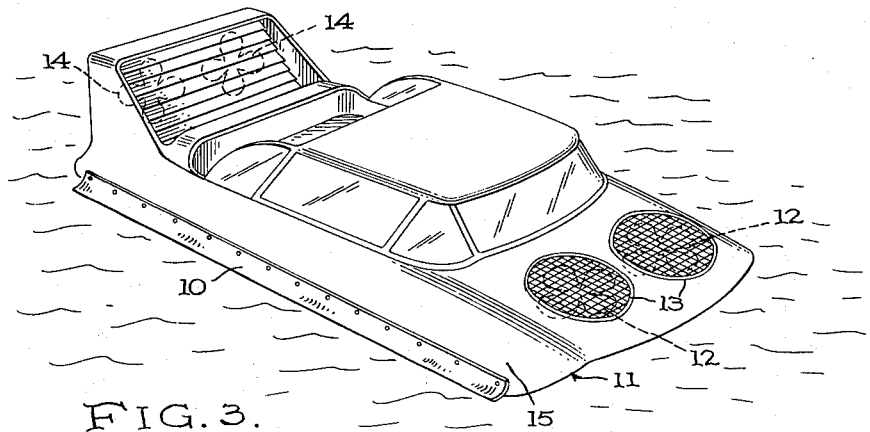

Oct. 5, 1965   M. W. BEARDSLEY   3,209,847
SPRAY SUPPRESSOR FOR AIR CUSHION VEHICLES
Filed Aug. 1, 1962

INVENTOR
MELVILLE W. BEARDSLEY
BY  A. Fred Starobin
ATTORNEY

United States Patent Office 3,209,847
Patented Oct. 5, 1965

3,209,847
SPRAY SUPPRESSOR FOR AIR CUSHION VEHICLES
Melville W. Beardsley, Severna Park, Md., assignor, by mesne assignments, to A. Fred Starobin, Washington, D.C.
Filed Aug. 1, 1962, Ser. No. 213,957
4 Claims. (Cl. 180—7)

The present invention relates to air cushion vehicles or ground effects machines and has particular reference to an improved means for suppressing spray raised during the operation of those types of vehicles over water or fine sand.

Because of the construction of air cushion vehicles and the principles by which they operate, the problems encountered in their operation are peculiarly their own. One of the most effective forms of the air cushion vehicle is the peripheral jet type which is sustained above a surface by the impingement of a curtain of air on the surface. This curtain of air contains part of the air flow beneath the vehicle, increasing the pressure against the bottom and thereby raising the vehicle.

When this type of vehicle is operated over a highly fluid surface such as water or fine sand, a spray is raised which is objectionable because it restricts the visibility of personnel in the vehicle and with open vehicles it drenches the vehicle occupants with water or sand as the case may be. It is also damaging to the fans of an air cushion vehicle when ingested in their entering air flow.

Spray cannot be prevented from forming as long as it is required in air cushion vehicles that high velocity air impinge upon and sweep directly over the fluid surface. But if the spray so formed is suppressed so as to remain at a low level adjacent to the surface, the objectionable results can be held to a minimum or even eliminated.

Therefore it is an object of this invention to suppress the amount of spray and the height to which it rises and thereby improve visibility and decrease the ingestion of water or sand in the fans.

The present invention due to its novel structure will also decrease the formation of ice due to freezing spray on the air cushion vehicle when operated in frigid temperatures.

Additional advantages of the present invention are its light weight construction, low cost of construction and installation, and the low drag created by the novel construction.

A further advantage is the suppleness of the spray suppressor which allows it a freedom from damage due to impact.

Furthermore the spray suppressor of the present invention does not increase the solid width of the vehicle.

Other objects and advantages will be apparent from a detailed description of the invention and from the appended drawings and claims.

Figure 3:
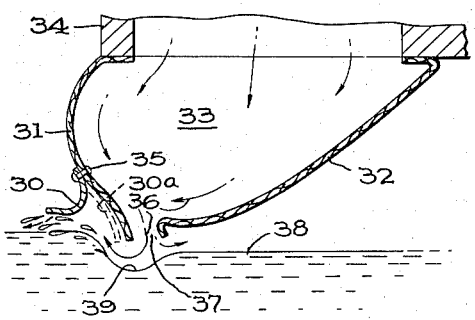
Figure 2:
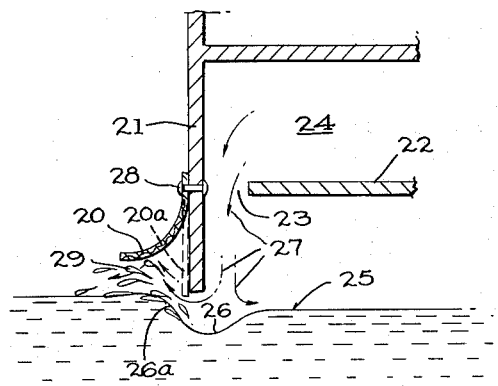
Figure 4:
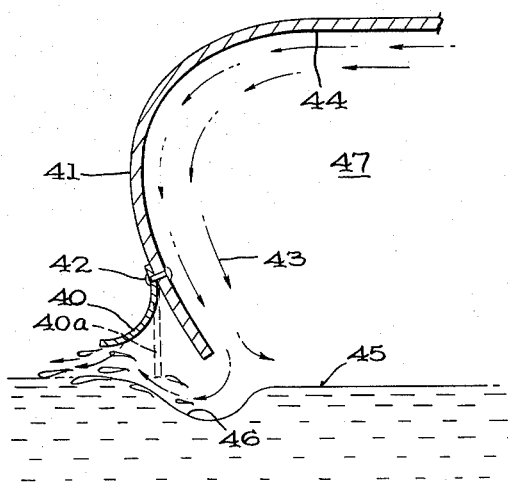

In the drawings:

FIG. 1 is a perspective view of an air cushion vehicle outfitted with the spray suppressor of the present invention; and FIGS. 2, 3, and 4 are partial sectioned views of different embodiments of vehicles using the principle of operation of air cushion vehicles or ground effect machines equipped with the device of the present invention.

In FIG. 1 there is shown an air cushion vehicle designed primarily for operation over water. This is merely one of the vehicles of the family of air cushion vehicles which may use the present invention. In this figure the general overall aspect of the spray suppressor of the present invention is shown. Hull 11, having fans 12 located under gratings 13 for providing lift for the air cushion vehicle, and fans 14 located in the rear for forward propulsion, has a spray suppressor 10 attached near the lower edge along the side of hull 11. Although it would be possible to install the spray suppressor on the front and rear of the vehicle, this will not be done in ordinary use. The vehicle will pass over the spray formed at the front before the spray formed can become objectionable to those on board except in the case of the vehicle hovering. The use of this craft to hover over water is not considered significant, since the craft will usually be allowed to float on the surface when not in transit in order to conserve fuel. In the case of craft which will be used where hovering is often necessary, the spray suppressor may be installed on front and rear also.

Spray suppressor 10 is a flexible strip which is attached generally near the lower edge of the side wall 15 of the air cushion vehicle hull 11. The attachment to the side wall may be made by any of several means such as, for example, the use of bolts, or the use of adhesive, or a combination of these.

FIGS. 2, 3, and 4 are partial views in section of the lower edges of three embodiments of types of peripheral jet air cushion vehicles which may make effective use of the spray suppressor of the present invention. These are merely examples of the use of the spray suppressor and are not to be considered as the only type of air cushion vehicles which may use the device of the present invention.

FIG. 2 illustrates the type of peripheral jet air cushion vehicle with solid side walls 21 and a bottom 22 closed except for slotted openings 23 which extend along the periphery of the vehicle. Air is blown into chamber 24 in the vehicle and then passes out through slotted opening 23 and impinges with a high velocity on surface 25 which may be a highly fluid surface such as water or fine sand. When surface 25 beneath the vehicle is of such highly fluid texture, the stream of air will scoop out a portion causing a depression 26 to be formed in surface 25. The air flow depicted by arrows 27 which escapes from under the vehicle thereby contributing only to the formation of the air curtain which maintains the higher pressure against the bottom wall 22, is given an upward direction due to the outside edge 26a of depression 26. A flexible sheet 20 which is attached to side wall 21 by means of bolt 28 is positioned so that spray 29 impinges upon it. Spray 29 is thus deflected downwardly by flexible sheet 20 from its upward path to a direction substantially parallel to the fluid surface. Gravity then pulls the droplets of water, or the grains of sand, as the case may be, down onto the surface so that they do not become objectionable.

In FIG. 3 the bottom side wall 31 and inner bottom wall 32 forming a chamber 33 under hull 34 into which air is pumped are made of a flexible material. The flexible bottomed type of air cushion vehicle has been found to possess desirable characteristics not shared by the solid walled type of FIG. 2. Flexible sheet spray suppressor 30 attached to flexible side wall 31 by means of bolt 35 is similar to sheet 20. As with the embodiment of FIG. 2 the air flow depicted by arrows 36 in FIG. 3 passes out of chamber 33 through slot 37 impinging against surface 38 forming a depression 39 therein and causing the air flow which has picked up water droplets or grains of sand to impinge upon flexible sheet 30 and be deflected downward to travel in a direction substantially parallel to the surface 38 and then through gravitational force drop back to the surface 38 without being high enough above surface 38 at any time so as to be objectionable.

Flexible sheet spray suppressor 40 shown in FIG. 4 as attached to solid side wall 41 by means of bolt 42 operates in the same manner as suppressors 20 and 30. The difference between the cases is in the embodiment of the air cushion vehicle using the spray suppressor. FIG. 4 is a partial view of a conformal flow type of air cushion vehicle which does not need a bottom surface to act as a peripheral jet type of air cushion vehicle. Air depicted by arrows 43 is caused to flow parallel to the inner surface 44 of the top of the vehicle fan deck. The air flow 43 follows the contour of the inner surface 44 until ejected in a sheet at the bottom of side wall 41 and impinging on surface 45. As in the previous cases, a depression 46 is formed which gives the air flow 43 an upward direction after having picked up water droplets or sand particles. Upon impingement with sheet 40 the particles or droplets move substantially parallel to surface 45 eventually dropping back to surface 45.

The flexible sheet spray suppressors 20, 30 and 40 are shown in the respective figures in dotted outlines 20a, 30a and 40a to illustrate their comparative vertical lengths in relation to the bottom portion of the air cushion vehicles. It will be noted from these illustrations, for most effective spray suppression, the spray suppressors 20, 30 and 40 (20a 30a and 40a) reach substantially to the lower edge of the walls of the respective types of air cushion vehicles.

The flexible sheet spray suppressors 10, 20, 30 and 40 have additional advantages due to their flexibility. The flexible sheet spray suppressor is not likely to be damaged by striking obstructions nor by wave impacts. Also, being flexible, it does not cause appreciable drag when in contact with a water surface.

Although the flexible sheet spray suppressor of the present invention has been illustrated as used with peripheral jet air cushion vehicles since these are by far the most efficient type of air cushion vehicle, this invention may be similarly used with other types of air cushion vehicles, such as the plenum chamber type. Such a case will be much like the illustration in FIG. 4 except that air flow 43 will not be confined to striking surface 45 only at the peripheral edge of the vehicle but will strike surface 45 at some location under the vehicle. In such case all of surface 45 beneath chamber 47 will be pushed to a slightly lower level than the surface 45 which is not beneath chamber 47. Therefore the air flow will pick up water droplets, since this type of general depression would happen over a water surface but is not likely over fine sand surface. Water droplets in the air flow will be given an upwardly direction due to the sides of the general depression beneath the plenum chamber and thus impinge on the flexible sheet spray suppressor and generally act in the same manner as discussed in connection with other embodiments.

It will be obvious to those skilled in the art that various changes may be made without departing from the spirit of the invention and therefore the invention is not limited to what is shown in the drawings and described in the specification but only as indicated in the appended claims.

What is claimed is:
1. An air cushion vehicle with a spray suppressor comprising
   a plenum shell,
   means for blowing air into said shell and exhausting the air in a substantially downward direction from said shell,
   said plenum shell having an upper surface,
   a depending wall connected to said upper surface,
   and a flexible membrane on the outside of said depending wall having
   an upper edge attached to said wall,
   and a lower edge substantially in the plane of the lower edge of said depending wall when in a free condition not being deflected outward by air flow issuing from under said shell.
2. The vehicle of claim 1 further characterized by
   said depending wall having at least a lower portion of flexible material.
3. The vehicle of claim 1 further characterized by
   said depending wall having a rigid curved surface sloping inwardly towards its bottom.
4. The vehicle of claim 1 further characterized by
   said depending wall having at least a lower portion of flexible material,
   and a second depending flexible wall confining air flow from said shell between it and said other first mentioned depending wall with exhaust from said shell passing downward between said depending flexible walls.

References Cited by the Examiner
UNITED STATES PATENTS

| | | | |
|---|---|---|---|
| 1,698,482 | 1/29 | Nicin | 180—7 |
| 3,027,860 | 4/62 | Priest | 180—7 |

FOREIGN PATENTS

| | | |
|---|---|---|
| 137,405 | 4/61 | Russia. |
| 860,781 | 2/61 | Great Britain. |
| 1,251,967 | 12/60 | France. |

OTHER REFERENCES

Publication: "Symposium on Ground Effect Phenomena," October 21–23, 1959, pages 28, 38, 39, 102, 103, 108.

A. HARRY LEVY, *Primary Examiner.*